United States Patent
Park et al.

(10) Patent No.: US 11,720,435 B2
(45) Date of Patent: Aug. 8, 2023

(54) ELECTRONIC DEVICE AND FAULT DIAGNOSIS METHOD OF ELECTRONIC DEVICE

(71) Applicant: SAMSUNG ELECTRONICS CO., LTD., Suwon-si (KR)

(72) Inventors: Minji Park, Suwon-si (KR); Jeehyeok Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/261,433

(22) PCT Filed: Jul. 31, 2019

(86) PCT No.: PCT/KR2019/009509
§ 371 (c)(1),
(2) Date: Jan. 19, 2021

(87) PCT Pub. No.: WO2020/027560
PCT Pub. Date: Feb. 6, 2020

(65) Prior Publication Data
US 2021/0311812 A1    Oct. 7, 2021

(30) Foreign Application Priority Data

Jul. 31, 2018   (KR) .................... 10-2018-0089342

(51) Int. Cl.
*G06F 11/07*         (2006.01)
*G06F 11/32*         (2006.01)

(52) U.S. Cl.
CPC ........ *G06F 11/079* (2013.01); *G06F 11/0772* (2013.01); *G06F 11/0793* (2013.01); *G06F 11/327* (2013.01)

(58) Field of Classification Search
CPC ............... G06F 11/079; G06F 11/0772; G06F 11/0793; G06F 11/327
See application file for complete search history.

(56) References Cited

U.S. PATENT DOCUMENTS 7,293,203 B1 * 11/2007 Coatney ............. G06F 11/0727
714/42
7,962,790 B2     6/2011 Son et al.
(Continued)

FOREIGN PATENT DOCUMENTS

JP        2009-48646        3/2009
JP        2017-97839        6/2017
(Continued)

OTHER PUBLICATIONS

International Search Report for PCT/KR2019/009509 dated Nov. 21, 2019, 5 pages with English Translation.
(Continued)

*Primary Examiner* — Jigar P Patel
(74) *Attorney, Agent, or Firm* — Nixon & Vanderhye, P.C.

(57) ABSTRACT

An electronic device for diagnosing a fault of a plurality of external devices is disclosed. The electronic device comprises a communication unit and a processor. The processor receives, from the plurality of external devices, information related to an operation of the plurality of external devices through the communication unit; on the basis of the information related to the operation of any one of the plurality of external devices, determines whether any external device is operating abnormally; when the external device is operating abnormally, diagnoses the cause of the abnormality on the basis of the information related to the operation of the one external device and information related to an operation of another external device of the plurality of external devices that is relevant to the operation of the one external device;

(Continued)

and provides, via the communication unit, information on the diagnosed abnormality to the at least one of the one external device and a communication device of a user of the external devices.

7 Claims, 14 Drawing Sheets

(56) References Cited

U.S. PATENT DOCUMENTS

| | | | |
|---|---|---|---|
| 8,255,351 B2 | 8/2012 | Lee et al. | |
| 9,297,841 B2 | 3/2016 | Chun et al. | |
| 2012/0290266 A1* | 11/2012 | Jain | G16H 50/20 |
| | | | 702/187 |
| 2017/0019291 A1* | 1/2017 | Tapia | H04L 41/16 |
| 2017/0257226 A1 | 9/2017 | Bi | |
| 2018/0054490 A1* | 2/2018 | Wadhwa | G01S 5/0263 |
| 2018/0129492 A1* | 5/2018 | Singh | G06F 11/00 |
| 2018/0190378 A1 | 7/2018 | Takei | |
| 2018/0199156 A1* | 7/2018 | Gandhi | H04W 4/06 |
| 2018/0211176 A1* | 7/2018 | Khurshudov | H04L 67/12 |
| 2019/0075080 A1* | 3/2019 | Entezari | H04L 63/061 |

FOREIGN PATENT DOCUMENTS

| | | |
|---|---|---|
| JP | 6356920 | 7/2018 |
| KR | 10-2001-0017425 | 3/2001 |
| KR | 10-2008-0050979 | 6/2008 |
| KR | 10-2010-0028360 | 3/2010 |
| KR | 10-2013-0115021 | 10/2013 |
| KR | 10-1576433 | 12/2015 |
| KR | 10-1708181 | 2/2017 |

OTHER PUBLICATIONS

Written Opinion of the ISA for PCT/KR2019/009509 dated Nov. 21, 2019, 9 pages with English Translation.

* cited by examiner (a)

(b)

ELECTRONIC DEVICE AND FAULT DIAGNOSIS METHOD OF ELECTRONIC DEVICE

This application is the U.S. national phase of International Application No. PCT/KR2019/009509 filed Jul. 31, 2019 which designated the U.S. and claims priority to KR Patent Application No. 10-2018-0089342 filed Jul. 31, 2018, the entire contents of each of which are hereby incorporated by reference.

FIELD

This disclosure relates to an electronic device for diagnosing a fault of a plurality of external devices and, more particularly to, an electronic device which, when a fault in operation of a specific external device is identified, diagnoses a cause of the identified fault in comprehensive consideration of information related to an operation of a specific external device, information related to an operation of another external device, and environment information, or the like.

DESCRIPTION OF RELATED ART

When an operation of a home appliance has a fault, in a related art, a user may call an after-sales service (AS) center, and the AS center may guide the user to connect communication between the home appliance with a cloud server, or the like, and then receive data of the corresponding home appliance from a cloud server and the like, analyze the data, and find a cause of the fault.

In the case above, it takes a long time to receive and analyze data from a home appliance.

In addition, the related-art analysis method may identify a cause of the fault by focusing on a result of collecting and analyzing data of the home appliance in a focused manner and thus, it is difficult to respond to various situations flexibly.

SUMMARY

An object of the disclosure is to provide an electronic device which receives data from a plurality of external devices even before an operation of a specific external device has a fault and if there is a fault in operation of a specific external device, the electronic device may suitably grasp a cause of the fault by using not only information related to an operation of a specific external device but also information related to art operation of another external device.

An electronic device for diagnosing a fault of a plurality of external devices according to an embodiment of the disclosure which has been made to solve the above described problems includes a communication unit and a processor, and the processor may receive, from the plurality of external devices, information related to an operation of the plurality of external devices through the communication unit, based on the information related to the operation of any one of the plurality of external devices, identify whether the external device has a fault, based on the operation of the external device having a fault, identify a cause of the fault based on the information related to the operation of the external device and information related to an operation of another external device of the plurality of external devices that is relevant to the operation of the external device, and provide, through the communication unit, information on the identified fault to the at least one of the external device and a communication device of a user of the external device.

The processor may identify whether the external device has a fault based on the identified cause of the fault, and provide the information on the identified fault to at least one of the external device and the communication device.

The processor may receive a diagnosis request for the external device from at least one of the external device or the communication device through the communication unit, and based on receiving the diagnosis request, identify whether the operation of the external device for which the diagnosis is requested has a fault.

The processor may, in response to receiving the diagnosis request, identify another external device which performs an operation having a same fault as an operation of the external device for which the diagnosis is requested, among the plurality of external devices, based on information relevant to the operation of the plurality of external devices, identify a cause of the operation of the identified external device based on the information relevant to the operation of the plurality of external devices, and provide information about the identified cause of the fault of the external device to at least one of the identified external device and a communication device of a user of the identified external device.

The processor may, based on the fault of the operation of the external device, transmit information indicating the fault and information on the identified cause of the fault to at least one of the external device and the communication device.

The processor may receive a diagnosis request for the external device from at least one of the external device and the communication device through the communication unit, and based on the received diagnosis request, transmit information on the identified cause of the fault to at least one of the external device and the communication device.

The processor may identify whether the operation of the external device has a fault based on a cycle that is determined based on at least one of a number of receiving the diagnosis request with respect to the external device and a history of the fault.

The processor may identify the cause of the fault based on information relevant to the operation of the external device and information relevant to an operation of another external device which is present in a vicinity of the external device among the plurality of external devices.

The processor may request environment information of a place where the external device is present to another external device present in a vicinity of the external device among the plurality of external devices through the communication unit, receive the environment information from the another external device through the communication unit, and identify the cause of the fault based on the received environment information.

According to another embodiment of this disclosure, a method of diagnosing a fault of an electronic device for a plurality of external devices includes receiving, from the plurality of external devices, information related to an operation of the plurality of external devices; based on the information related to the operation of any one of the plurality of external devices, identifying whether the external device has a fault; based on the operation of the external device having a fault, identifying a cause of the fault based on the information related to the operation of the external device and information related to an operation of another external device of the plurality of external devices that is relevant to the operation of the external device; and providing information on the identified fault to the at least one of the external device and a communication device of a user of the external device.

The method may further include identifying whether the external device has a fault based on the identified cause of the fault; and providing the information on the identified fault to at least one of the external device and the communication device.

The method may further include receiving a diagnosis request for the external device from at least one of the external device or the communication device, wherein the identifying whether the external device has a fault may include, based on receiving the diagnosis request, identifying whether the operation of the external device for which the diagnosis is requested has a fault.

The method may further include, in response to receiving the diagnosis request, identifying another external device which performs an operation having a same fault as an operation of the external device for which the diagnosis is requested, among the plurality of external devices, based on information relevant to the operation of the plurality of external devices; identifying a cause of the operation of the identified external device based on the information relevant to the operation of the plurality of external devices; and providing information about the identified cause of the fault of the external device to at least one of the identified external device and a communication device of a user of the identified external device.

The providing may include, based on the fault of the operation of the external device, transmitting information indicating the fault and information on the identified cause of the fault to at least one of the external device and the communication device.

The method may further include receiving a diagnosis request for the external device from at least one of the external device and the communication device, wherein the providing may include, based on the received diagnosis request, transmitting information on the identified cause of the fault to at least one of the external device and the communication device.

The identifying whether the operation of the external device has a fault may include identifying whether the operation of the external device has a fault based on a cycle that is determined based on at least one of a number of receiving the diagnosis request with respect to the external device and a history of the fault.

The identifying the cause of the fault may include identifying the cause of the fault based on information relevant to the operation of the external device and information relevant to an operation of another external device which is present in a vicinity of the external device among the plurality of external devices.

The identifying the cause of the fault may include requesting environment information of a place where the external device is present to another external device present in a vicinity of the external device among the plurality of external devices through the communication unit, receiving the environment information from the another external device, and identifying the cause of the fault based on the received environment information.

An electronic device according to the disclosure has an excellent diagnosis speed compared to the related art when an operation of a specific external device has a fault, by receiving and storing, in advance, information related to operation of a plurality of external devices according to a predetermined cycle or a predetermined condition.

The electronic device according to the disclosure may diagnose a cause of a fault by using not only a specific external device having a fault in operation but also information related to an operation of another related external device and environment information and thus, the disclosure can diagnose a cause of a fault by considering a condition and a situation in a wider range and come up with a suitable countermeasure, instead of immediately identifying a fault in an external device only through an identified fault in an operation of a specific external device.

DETAILED DESCRIPTION OF EXAMPLE EMBODIMENTS

Figure 1:
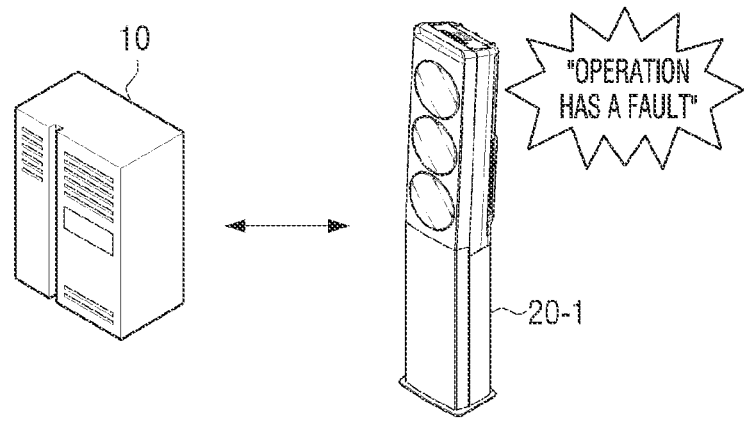
FIG. 1 is a diagram illustrating a difference of an electronic device between a related art and the disclosure.
Figure 1:
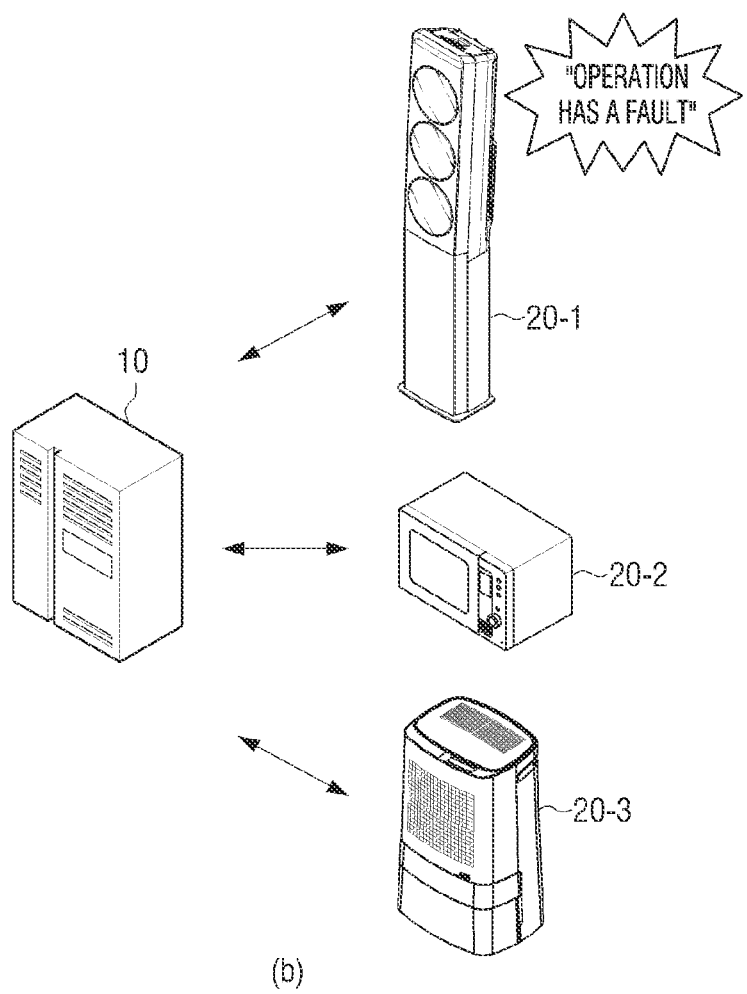

Before specifically describing the disclosure, a method for demonstrating the present specification and drawings will be described.

The terms used in the present specification and the claims are general terms identified in consideration of the functions of the various embodiments of the disclosure. However, these terms may vary depending on intention, legal or technical interpretation, emergence of new technologies, and the like of those skilled in the related art. Also, there may be some terms arbitrarily identified by an applicant. Unless there is a specific definition of a term, the term may be construed based on the overall contents and technological common sense of those skilled in the related art.

Further, like reference numerals indicate like components that perform substantially the same functions throughout the disclosure. For convenience of descriptions and understanding, the same reference numerals or symbols are used and described in different example embodiments. In other words, although elements having the same reference numerals are all illustrated in a plurality of drawings, the plurality of drawings do not refer to one embodiment.

The terms such as "first," "second," and so on may be used to describe a variety of elements, but the elements should not be limited by these terms. The terms are used for the purpose of distinguishing one element from another. For example, the elements associated with the ordinal numbers should not be limited in order or order of use, order of arrangement, or the like, by the numbers. If necessary, the ordinal numbers may be replaced with each other.

A singular expression includes a plural expression, unless otherwise specified. It is to be understood that the terms such as "comprise" or "consist of" may, for example, be used to designate a presence of a characteristic, number, step, operation, element, component, or a combination thereof, and not to preclude a presence or a possibility of adding one or more of other characteristics, numbers, steps, operations, elements, components or a combination thereof.

The term such as "module," "unit," "part", and so on may refer, for example, to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

When any part is connected to another part, this includes a direct connection and an indirect connection through another medium. Further, when a certain part includes a certain element, unless specified to the contrary, another element may be additionally included, rather than precluding another element.

FIG. 1 is a diagram illustrating a difference of an electronic device between a related art and the disclosure.

Referring to FIG. 1A, a related art electronic device 10 which is represented as a server may, for example, receive information related to an operation of an air conditioner 20-1 from the air conditioner 20-1 when there is a fault in an operation of the air conditioner 20-1, such as ambient temperature does not fall to a target temperature, even though the air conditioner 20-1, which is an external device, is being operated by manipulation of a user.

The electronic device 10 may analyze which fault the air conditioner 20-1 may have based on the received information.

Unlike the related-art, the electronic device according to the disclosure may receive information related to the operation of the other external device as well as an external device which has a fault in operation. As a result, an accurate diagnosis result based on various information can be provided in diagnosing the fault of an external device.

Referring to FIG. 1B, the electronic device 10 represented as a server can receive information related to operation of an oven 20-2 and an air cleaner 20-3, which is another external device, as well as an air conditioner 20-1 that has a fault in operation.

For example, there may be a case that a fault of taking a longer time in cooling of the air conditioner 20-1 than a normal time due to the operation of the oven 20-2 or the air cleaner 20-3 in the vicinity of the air conditioner 20-1.

In this case, referring to the related art as FIG. 1A, the server 10 may analyze the cause of the fault based solely on information related to the operation of the air conditioner 20-1, and the server 10 may analyze whether there is a fault in each component included in the air conditioner 20-1 based on a premise that the air conditioner 20-1 has a fault. In other words, even if there is no fault in the air conditioner 20-1, an error to attempt to find one or more causes of the fault from the air conditioner 20-1 may occur.

When the server 10 receives information related to the operation from other external devices such as an oven 20-2 and an air cleaner 20-3 as well as the air conditioner 20-1, as shown in FIG. 1B, the cause of the fault may not be found from the air conditioner 20-1 itself but various information which can affect the operation of the air conditioner 20-1 can be checked. As a result, the server 10 may identify that the cause of the fault in operation of the air conditioner 20-1 is due to the operation of the oven 20-2 and the air cleaner 20-3 which are arranged around the air conditioner 20-1 and operate.

Referring to FIG. 1, a distinctive configuration and effect of the electronic device is illustrated. Hereinafter, various embodiments of the electronic device will be illustrated with reference to drawings.

Figure 2:
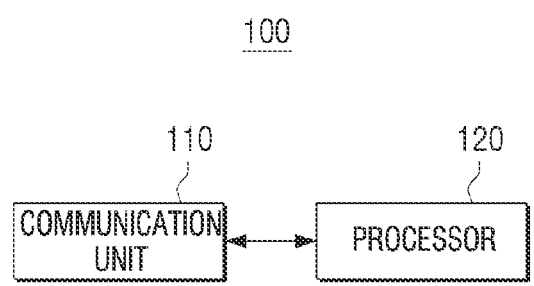
FIG. 2 is a block diagram illustrating a configuration of electronic device according to an embodiment.

FIG. 2 is a block diagram illustrating the electronic device 100 according to an embodiment.

The electronic device 100 can be communicatively connected with at least one external device and is conventionally implemented with a server having a relatively large amount of data storage space, a cloud server, a server management computer, or the like.

The electronic device 100 may be implemented as a terminal device, a smartphone, a desktop personal computer (PC), a tablet PC, a laptop PC, a display device, or the like, which can be communicatively connected with at least one external device.

The electronic device 100 may be implemented as a system including one or more communication device and main computer.

Referring to FIG. 2, the electronic device 100 may include a communication unit 110 and a processor 120.

The communication unit 110 is configured to enable the electronic device 100 to communicate with various types of external devices and/or other servers according to various types of communication schemes. The communication unit 110 may include a Wi-Fi chip (not shown), a Bluetooth chip (not shown), and the like. The communication unit 110 can perform data communication with various external devices in a wire or wireless manner.

When performing data communication with an external device (not shown) in a wireless communication scheme, the communication unit 110 may include a wireless communication module (not shown) such as a wireless LAN communication module (not shown) or a mobile communication module (not shown). The wireless LAN module is a module for performing communication by being connected to an external network according to a wireless communication protocol such as WiFi, IEEE, WiBro, etc., and the wireless communication module is a module for performing communication by connecting to a mobile communication network according to various mobile communication standards such as third generation (3G), 3rd generation partnership project (3GPP), long term evolution (LTE), or the like.

The processor 120 is configured to control overall operations of the electronic device 100. The processor 120 may include, for example, one or more among a central processing unit (CPU), a controller, an application processor (AP), a communication processor (CP), or an advanced reduced instruction set computing (RISC) machine (ARM) processor.

The processor 120 may include random access memory (RAM) (not shown), read only memory (ROM) (not shown), system bus (not shown), or the like.

The processor 120 may communicate with one or more external devices through the communicator 110.

Figure 3:
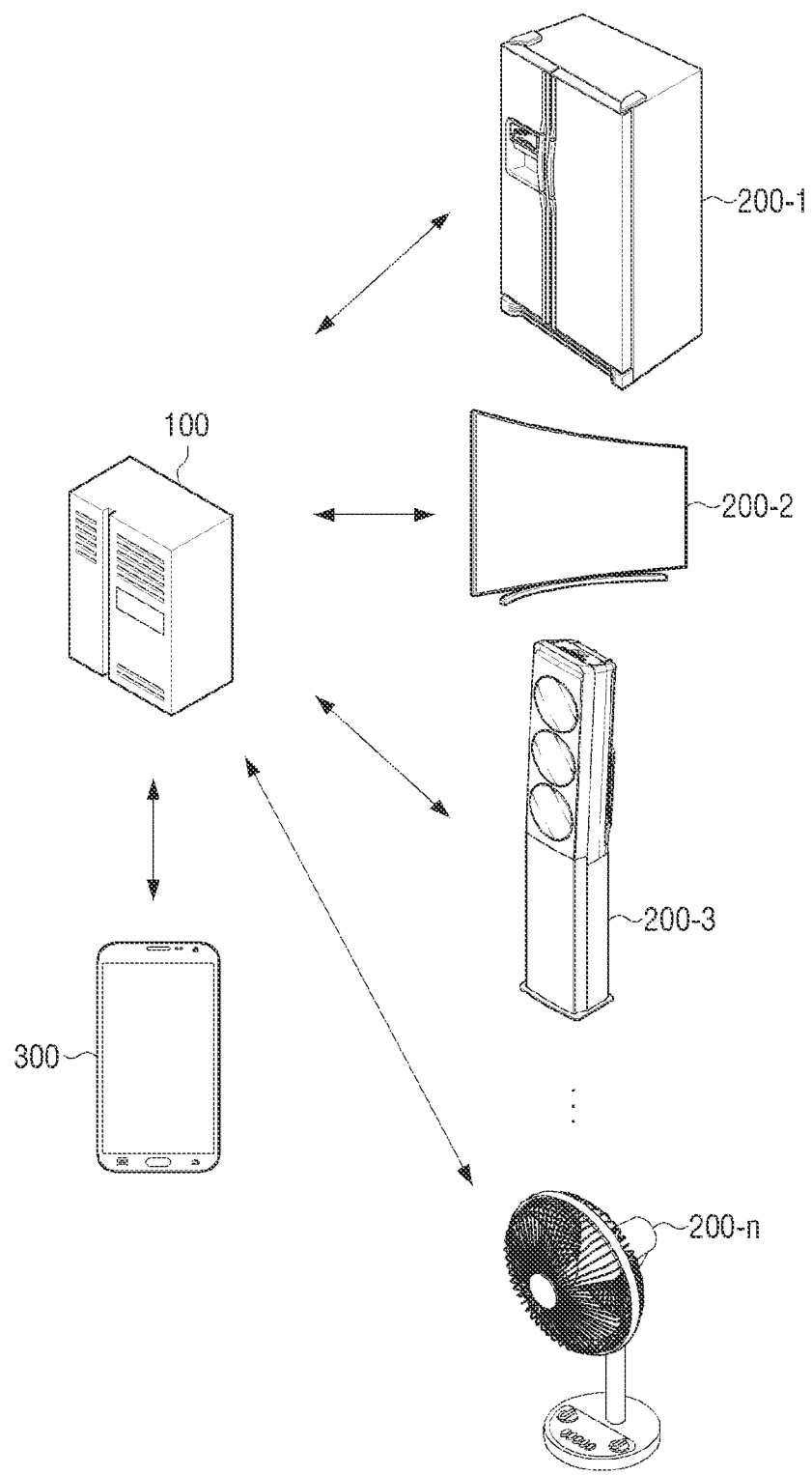
FIG. 3 is a diagram illustrating an operation of an electronic apparatus, a plurality of external devices, and a communication device.

FIG. 3 is a diagram illustrating an operation of the electronic device 100, a plurality of external devices 200-1, 200-2, ..., 200-n, and a communication device 300.

Referring to FIG. 3, the processor 120 of the electronic device 100 may communicate with a plurality of external devices 200-1, 200-2, ..., 200-n and the communication device 300 through the communicator 110.

In a plurality of external devices 200-1, 200-2, ..., 200-n, one or more types of home appliances such as a refrigerator 200-1, a television 200-2, an air conditioner 200-3, a fan 200-n, or the like, may be included. Although not shown in FIG. 3, various home appliances such as a home personal computer (PC), a washing machine, a speaker, an electrical port, an electronic range, etc. can be included in external devices 200-1, 200-2, ..., 200-n.

A plurality of external devices 200-1, 200-2, ..., 200-n are not limited to a home appliance, but may include another server, a terminal device, or the like.

The communication device 300 may be implemented as a wired telephone, a wireless telephone, a terminal device, a smartphone, or the like.

The communication device 300 may have a same user as at least one external device among a plurality of external devices 200-1, 200-2, ..., 200-n and may have been pre-registered in a storage (not shown) of the electronic device 100.

The processor 120 may receive information related to an operation of a plurality of external devices 200-1, 200-2, ..., 200-n from the plurality of external devices 200-1, 200-2, ..., 200-n through the communicator 110. The plurality of external devices 200-1, 200-2, ..., 200-n can receive information related to the operation of each of a plurality of external devices 200-1, 200-2, ..., 200-n from each of a plurality of external devices 200-1, 200-2, ..., 200-n.

The information related to the operation of the external device may include information about what the operation of the external device performs, and information on the process and the result of performing the operation, or the like. In addition, information of a state of at least one of components in the external device which the external device uses for performing an operation may be included as well.

For example, when the external device is an air cleaner, the information related to the operation of the air cleaner can include information on whether the air cleaner is performing an air cleaning operation, information on a mode of the air cleaning operation performed, information on a time when the air cleaning operation is performed, information on the state of the ambient air (which can be sensed by the air cleaner, etc.), or the like.

The information related to the operation of the air cleaner can also be information about the state of at least one component, such as a processor, a filter, a motor, or the like, in the air cleaner. In this case, the information on the state of the at least one component can be detected and/or analyzed based on a processor or an internal sensor in the air cleaner.

The processor 120 may receive information related to the operation at different times for each of the information related to the operation can be received at different times for each of a plurality of external devices 200-1, 200-2, ..., 200-n, and may receive information related to the operation in a preset cycle, but the preset cycle may be different for external devices.

The processor 120 may receive information related to the operation from a plurality of external devices 200-1, 200-2, ..., 200-n while maintaining a communication connection state with a plurality of external devices 200-1, 200-2, ..., 200-n, even though a diagnosis request is not received from the outside or an event such as input of a diagnosis command of a user does not occur.

The processor 120 may accumulate received information from a plurality of external devices 200-1, 200-2, ..., 200-n for a predetermined time and store the information in the electronic device 100, and may analyze if there is any fault in the plurality of external devices 200-1, 200-2, ..., 200-n based on the stored information, and if there is a fault, may analyze a cause thereof. The processor 120 can analyze, based on the stored information, whether there is fault in each of the plurality of external devices 200-1, 200-2, ... 200-n, and if there is a fault, what fault it is, or the like.

The processor 120 may identify whether there is a fault in the operation of the external device based on the information related to any one of an external device among a plurality of external devices 200-1, 200-2, ..., 200-n. Specifically, the processor 120 can identify whether or not the operation of the external device has a fault based on information about what operation is performed by the external device and the information on the process and result of the operation, and if there is a fault, what fault it is, or the like. In this case, the metadata about a plurality of external devices 200-2, 200-2, ..., 200-n prestored in the electronic device 100 can be used.

For example, if the corresponding external device is an air conditioner, if the ambient temperature measured by the air conditioner is maintained at least 25 degrees Celsius or higher, even if the air conditioner set at 22 degrees Celsius is cooled for a predetermined time or more, the processor 120 can identify that the operation of the air conditioner has a fault based on the metadata. Specifically, a fault that the cooling function of the air conditioner is not normal can be identified.

As a result of identification, when the operation of the external device has a fault, a cause of the fault can be identified based on information related to the operation of the external device and information related to an operation of another external device related to an operation of the corresponding external device, among the plurality of external devices 200-1, 200-2, ..., 200-n. In this case, metadata of the plurality of external devices 200-1, 200-2, ..., 200-n prestored in the electronic device 100 can be used.

At this time, other external devices which are associated with the operation of the external device may refer to other external devices of which a user is the same as the external device and/or another external device at the periphery of the external device (within a predetermined distance from a specific external device). In this case, the predetermined distance can vary depending on what type of home appliance the external device is.

For example, the processor 120 may identify a cause of the fault based on information related to the operation of the external device and information related to an operation of another external device present in the vicinity of the external device among a plurality of external devices 200-1, 200-2, . . . , 200-n.

Figure 4:
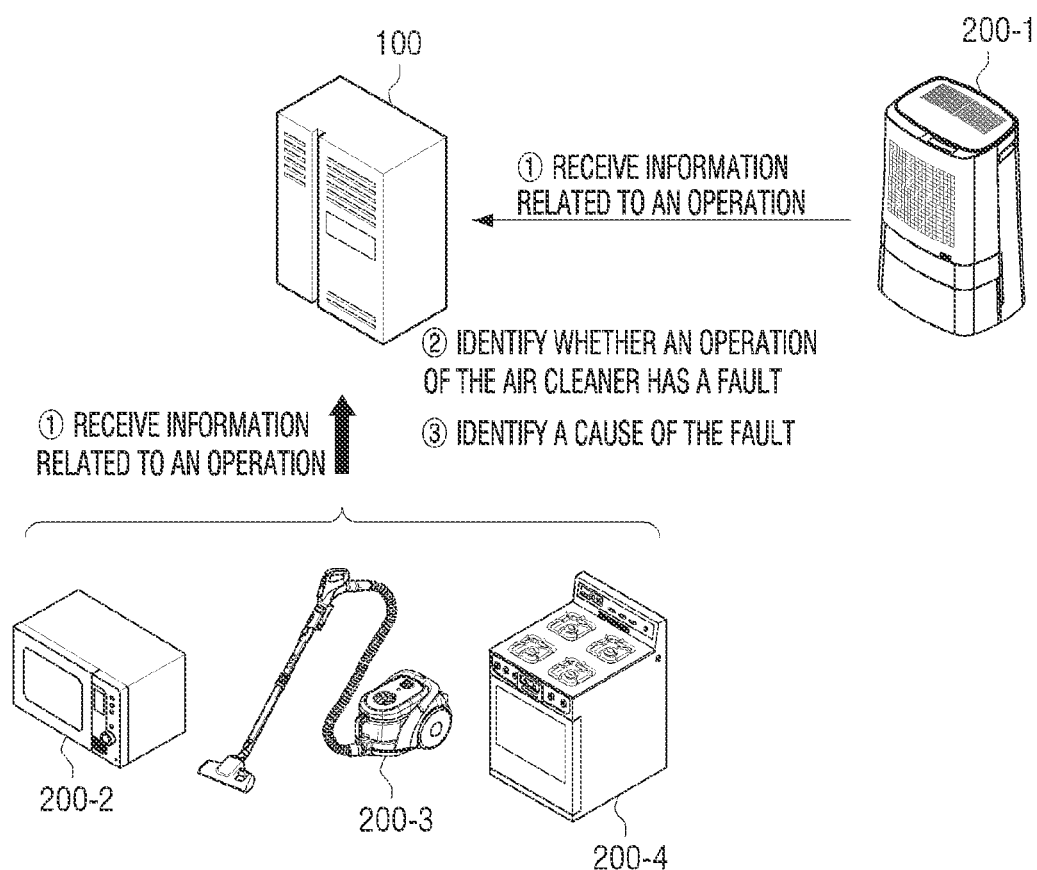
FIG. 4 is a diagram illustrating an example of receiving information related to an operation by an electronic device from a plurality of external devices to identify whether there is a fault in operation of a specific external device and grasping a cause of the fault.

FIG. 4 is a diagram illustrating an example of diagnosing at least one external device among a plurality of external devices 200-1, 200-2, 200-3, and 200-4 based on the result of analyzing the information received from the plurality of external devices 200-1, 200-2, 200-3, and 200-4 by the electronic device 100.

Referring to FIG. 4, the processor 120 may receive information related to operations of each of the plurality of external devices 200-1, 200-2, 200-3, and 200-4 through the communication unit 110 (①).

The processor 120 can identify whether or not the operation of the air cleaner 200-1, which is subject to diagnosis, among a plurality of external devices 200-1, 200-2, 200-3, and 200-4, has a fault (②). At this time, the processor 120 can identify whether or not the operation of the air cleaner 200-1 has a fault based on information related to the operation of the air cleaner 200-1 received from the air cleaner 200-1.

If there is a fault, the processor 120 may identify what is a cause of the identified fault (③). At this time, the processor 120 can identify the cause of the fault by considering not only information related to the operation of the air cleaner 200-1 but also information related to the operation of other external devices 200-2, 200-3, and 200-4 in the vicinity of the air cleaner.

To be specific, whether the cleaner 200-3 and a gas range 200-4 which are related to air purification operation of the air cleaner 200-1, or the like, can be considered together.

For example, air cleaning operation of the air cleaner 200-1 can be hindered by inhale operation of the cleaner 200-3 and traversal of the cleaner 200-3, or the like.

If a fault such as air cleaning rate of the air cleaner 200-1 falling than normal times is identified, while the cleaner 200-3 is operating, the processor 120 may determine one of the identified causes of the fault as the operation of the cleaner 200-3.

The processor 120 may receive a diagnosis request for the external device from at least one of the corresponding external device and the communication device 300 through the communication unit 110, and if the diagnosis request is received, the processor 120 may identify whether or not the operation of the external device with diagnosis request has a fault. At this time, the user of the external device with the diagnosis request and the communication device 300 may be identical, and the diagnosis request can be transmitted in an electronic signal or a data form.

Figure 5:
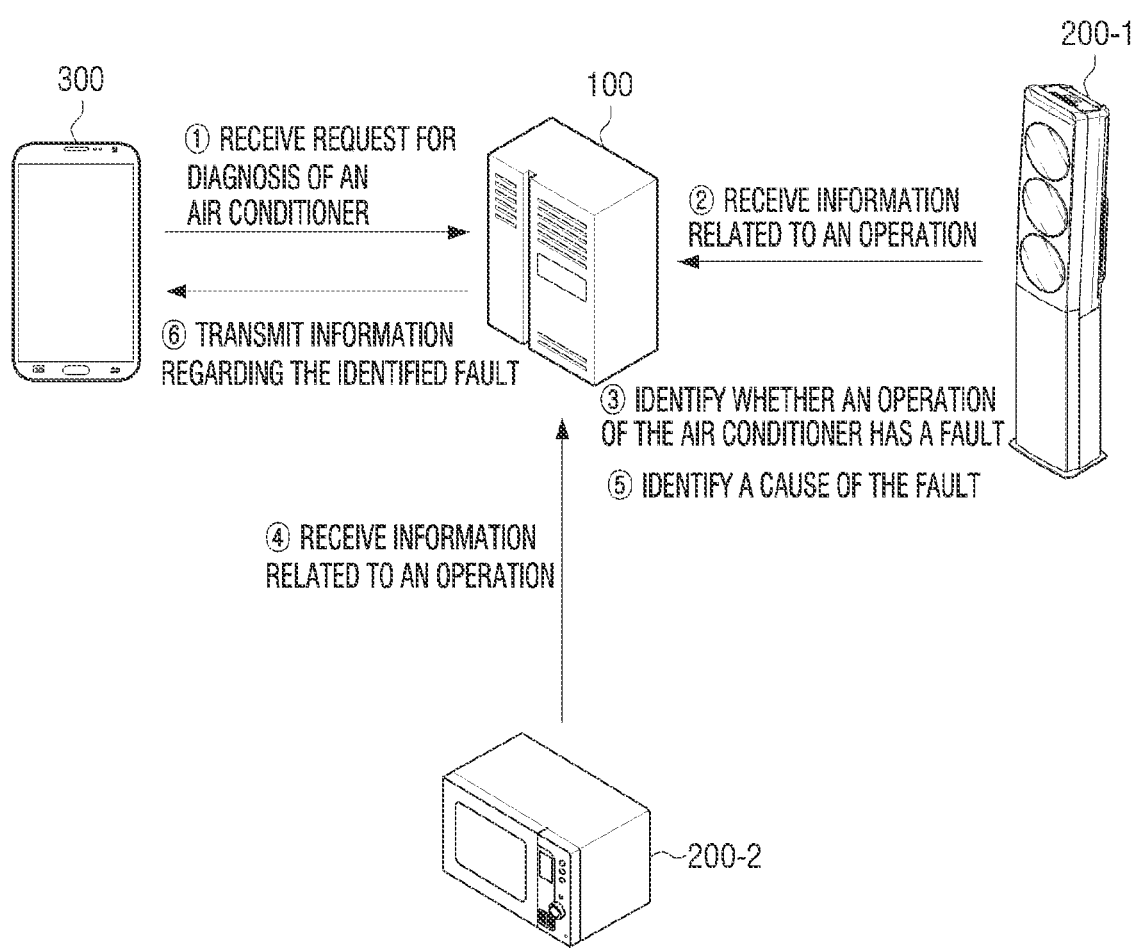
FIG. 5 is a diagram illustrating an example of identifying, by the electronic device receiving a diagnosis request, whether an operation of a specific external device has a fault and grasping a cause.

FIG. 5 is a diagram illustrating an example of identifying, by the electronic device receiving a diagnosis request, whether an operation of a specific external device has a fault and grasping a cause.

Referring to FIG. 5, the processor 120 may receive a diagnosis request for the air conditioner 200-1 from the communication device 300 through the communicator 110 (①).

In this case, the communication device 300 corresponds to the same user as the user of the air conditioner 200-1 and can be pre-registered in the electronic device 100. In one example, even though the information on the air conditioner 200-1 is not included in the diagnosis request received from the communication device 300, the processor 120 can identify the fact that the subject to diagnosis is the air conditioner 200-1 based on the pre-registered information about the user to correspond to the communication device 300.

Unlike FIG. 5, the processor 120 may receive a diagnosis request from the air conditioner 200-1 through the communicator 110.

When a diagnosis request is received, the processor 120 may receive information related to the operation of the air conditioner 200-1 from the air conditioner 200-1 (②), and can identify whether or not the operation of the air conditioner 200-1 has a fault based on the received information (③).

When there is a fault as a result of identification, the processor 120 may receive information related to the operation of the oven 200-2 from the oven 200-2 through the communication unit 110 (④), and can identify what is the cause of the fault based on the received information related to the operation of oven 200-2 and information related to the operation of the air conditioner 200-1 (⑤). For example, since the indoor temperature can be slightly higher when the oven 200-2 is operating, the operation of the oven 200-2 can be a cause of the fault of the operation of the air conditioner 200-1.

The order of the operations (① to ⑤) described above with reference to FIG. 5 is not limited to the case of FIG. 5, and the order of the operations can be changed in various orders. In one example, if a diagnosis request is received (①), the processor 120 may immediately receive information related to the operation of the oven 200-2 associated with the operation of the air conditioner 200-1 as well as the air conditioner 200-1 (②), (④).

If the electronic device 100 is implemented in a system form including at least one communication device (not shown) and a main computer (not shown), at least one communication device (not shown) included in the electronic device 100 may receive a diagnosis request for a specific external device among the plurality of external devices 200-1, 200-2, . . . , 200-n from the communication device 300. Thereafter, when at least one communication device (not shown) transmits a received diagnosis request to a server-management computer (not shown), the main computer (not shown) may identify whether or not the external device with diagnosis request has a fault in operation.

If an operation of one of the plurality of external devices 200-1, 200-2, . . . , 200-n has a fault, the processor 120 may transmit the identified information on the fault to at least one of the external device and the communication device 300 through the communication unit 110.

The information on the fault may include information indicating that the operation of the specific external device has a fault and information on the identified cause of the fault. The information on the fault may include information on a method for solving the cause of the fault.

Referring to FIG. 5 again, the processor 120 can transmit the identified information about the fault to the communication device 300 through the communication unit 110 (⑥). However, unlike FIG. 5, the information can be transmitted to the air conditioner 200-1.

As a specific example associated with FIG. 5, the processor 120 can transmit, to the communication device 300, information indicating that the operation of the air conditioner 200-1 has a fault, information indicating that one of the causes of the fault is operation of the oven 200-2, and information indicating that the fault of the operation of the air conditioner 200-1 can be mitigated by stopping the operation of the oven 200-2, or the like.

The processor 120 may identify whether or not the operation of the external device has a fault according to the cycle determined based on at least one of the number of times the diagnostic request for the particular external device is received and the history of the fault.

Specifically, if the diagnosis request for a particular external device has been received at or above a predetermined number of times, or the history of identified fault of the operation of a specific external device is larger than other external devices, the processor 120 can identify whether or not the operation of the specific external device has a fault in a relatively short cycle compared to other external devices even if a separate diagnosis request is not received.

The processor 120 may receive a diagnosis request for the external device from at least one of the one external device among the plurality of external devices 200-1, 200-2, . . . , 200-n and the communication device 300, through the communication unit 110, and based on the received diagnosis request, may transmit information about the identified cause of the fault to at least one of the external device and the communication device 300 based on the received diagnosis request.

In other words, when the processor 120 already identifies the fault of the operations of a specific external device and identifies the cause of the fault, if a diagnosis request is received, the information on the fault can be transmitted to at least one of the communication device 300 and the corresponding external device.

Figure 6:
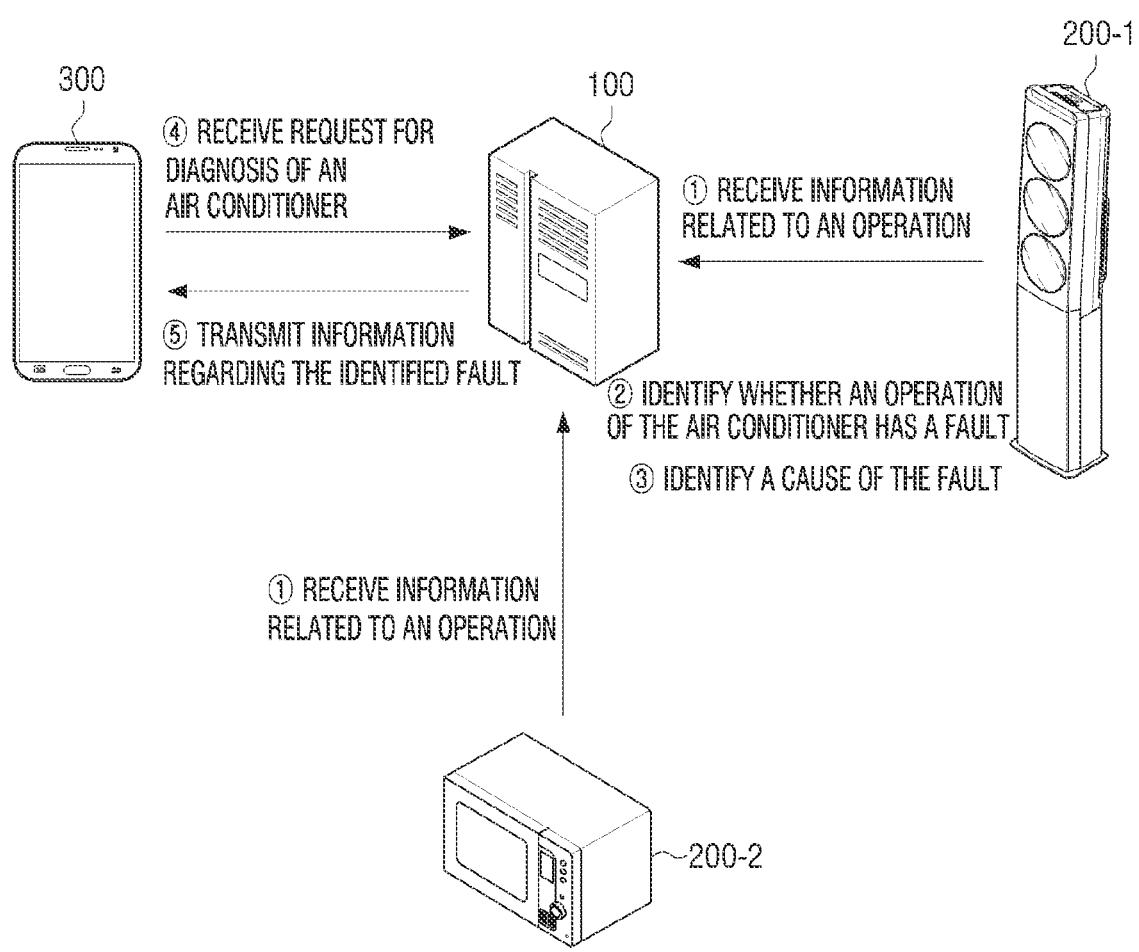
FIG. 6 is a diagram illustrating an example of an operation of an electronic device for transmitting the identified fault and cause based on the received diagnosis request.

FIG. 6 is a diagram illustrating an example of an operation of the electronic device 100 for transmitting the identified fault and cause based on the received diagnosis request.

Referring to FIG. 6, the processor 120 may receive information related to operation from other external devices including the oven 200-2 as well as the air conditioner 200-1 which is subject to diagnosis (①), identify whether the operation of the air conditioner has a fault based on the received information (②) and then identify what is the cause of the fault (③).

When a diagnosis request for the air conditioner 200-1 is received from the communication device 300 to the air conditioner 200-1 (④), the processor 120 can transmit the identified information about the fault to the communication device 300 through the communication unit 110 (⑤). Unlike FIG. 5, the processor 120 may transmit information on the identified fault to the air conditioner 200-1.

When the fault is identified in an operation of a specific external device among the plurality of external devices 200-1, 200-2, . . . , 200-n, the processor 120 may request environment information of a space where the external device is present in another external device present in the vicinity of the external device, through the communication unit 110.

The processor 120 may receive environment information from another external device through the communication unit 110 and may identify the cause of the fault based on the environment information.

The environment information can include information on the temperature, humidity, air pollution level, communication environment, etc. of the location where the external device, which is subject to diagnosis, is present. The environment information may include information on time for diagnosing a specific external device.

Figure 7:
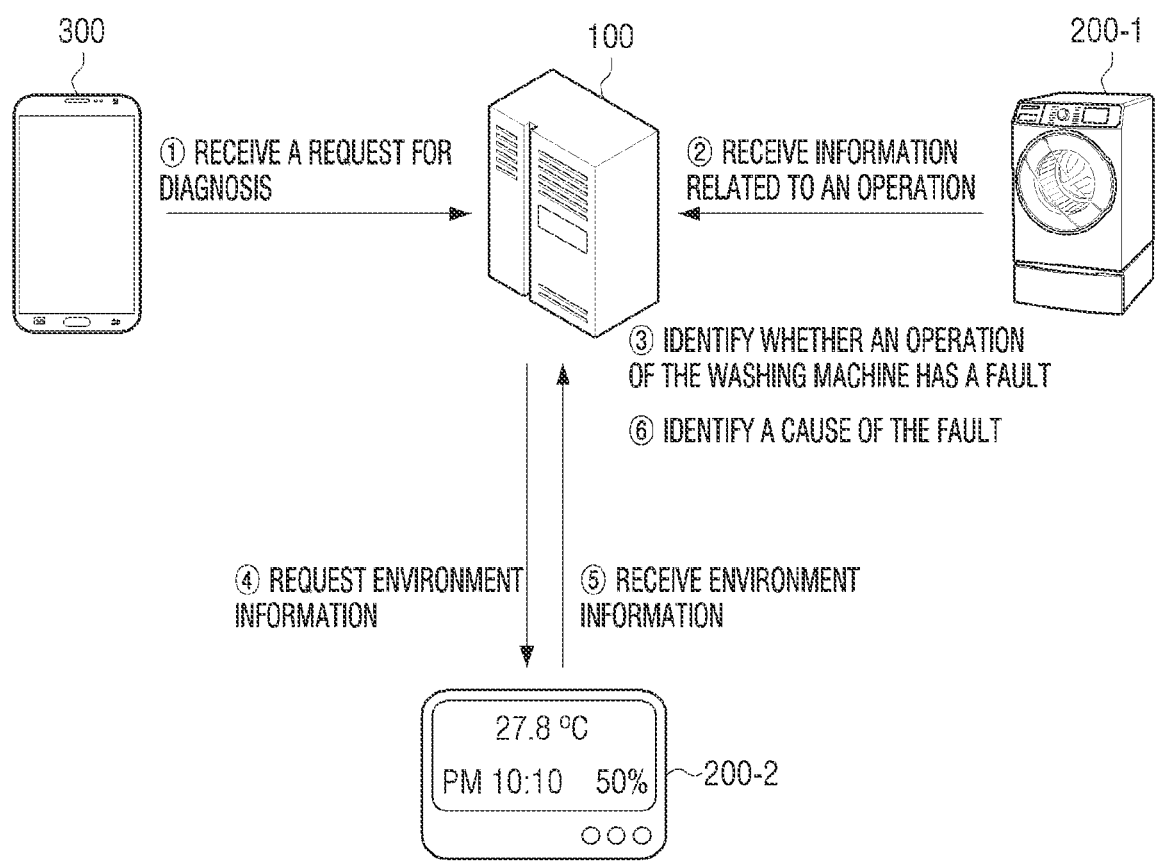
FIG. 7 is a diagram illustrating an example of identifying a cause of a fault based on receiving environment information of a specific external device which received a diagnosis request from another external device.

FIG. 7 is a diagram illustrating an example of identifying a cause of a fault based on receiving environment information of a specific external device which received a diagnosis request from another external device.

Referring to FIG. 7, when a diagnosis request for a washing machine 200-1 is received from the communication device 300 at the electronic device 100 (①), the processor 120 can receive information related to the operation of the washing machine 200-1 through the communication unit 110 (②), and identify whether or not the operation of the washing machine 200-1 has a fault based on the received information (③).

As a result of requesting environment information to a temperature sensor 200-2 located in the vicinity of the washing machine 200-1 through the communication unit 110 (④), the processor 120 may receive environment information on the temperature and humidity around the washing machine from the temperature sensor 200-2 (⑤).

Based on the received environment information, the processor 120 can identify the cause of the fault of the operation of the washing machine 200-1 (⑥). For example, when the ambient temperature is relatively low, a fault such as requiring a lot of time in operating the washing machine 200-1 to generate hot water for washing may occur, the processor 120 can identify that one of the causes of requiring a lot of time for the washing machine 200-1 to generate hot water for washing is high ambient temperature based on temperature information included in the environment information received from the temperature sensor 200-2.

If a fault in an operation of a specific external device is identified, the processor 120 may identify whether there is a fault in the external device based on the identified cause of the fault.

Specifically, the processor 120 can identify the cause of the fault is the external device itself, if no other cause is identified from information related to the operation of the other external device except for a specific external device that is subject to the diagnosis, or when it is identified that the fault of the operation of the current specific external device does not occur with only the identified cause based on the information related to the operation of the other external device.

In other words, it may be identified that the identified cause of the fault is a fault of the external device itself, and in this case, what is a specific fault of the external device itself can be identified based on information related to the operation of the external device which has a fault in the operation. At this time, metadata about a plurality of external devices 200-1, 200-2, . . . , 200-n prestored in the electronic device 100 may be used.

The identified information about the fault may be provided to at least one of the external device and the communication device 300.

When a diagnosis request is received, the processor 120 may identify another external device which performs an operation with a fault that is the same as the operation of the external device for which diagnosis is requested, among the plurality of external devices 200-1, 200-2, . . . , 200-n, based on the information related to the plurality of external devices 200-1, 200-2, . . . , 200-n.

Specifically, if a diagnosis request for a particular external device is received among the same type of external devices and it is identified that an operation of the external device has a fault, the processor 120 can identify that another external device corresponding to the information which corresponds to the received information (information related to operation) from the external device that receives the diagnosis request, among the same type external devices, by a preset value or more has the same fault.

The processor 120 may identify a cause of a fault of the operation of another external device based on information related to the operation of the plurality of external devices 200-1, 200-2, . . . , 200-n and provide the identified information on the cause of a fault of the other external device to at least one of the identified other external device or the communication device 300. In this case, the communication device 300 can be a communication device of a user of the identified other external device.

Figure 8:
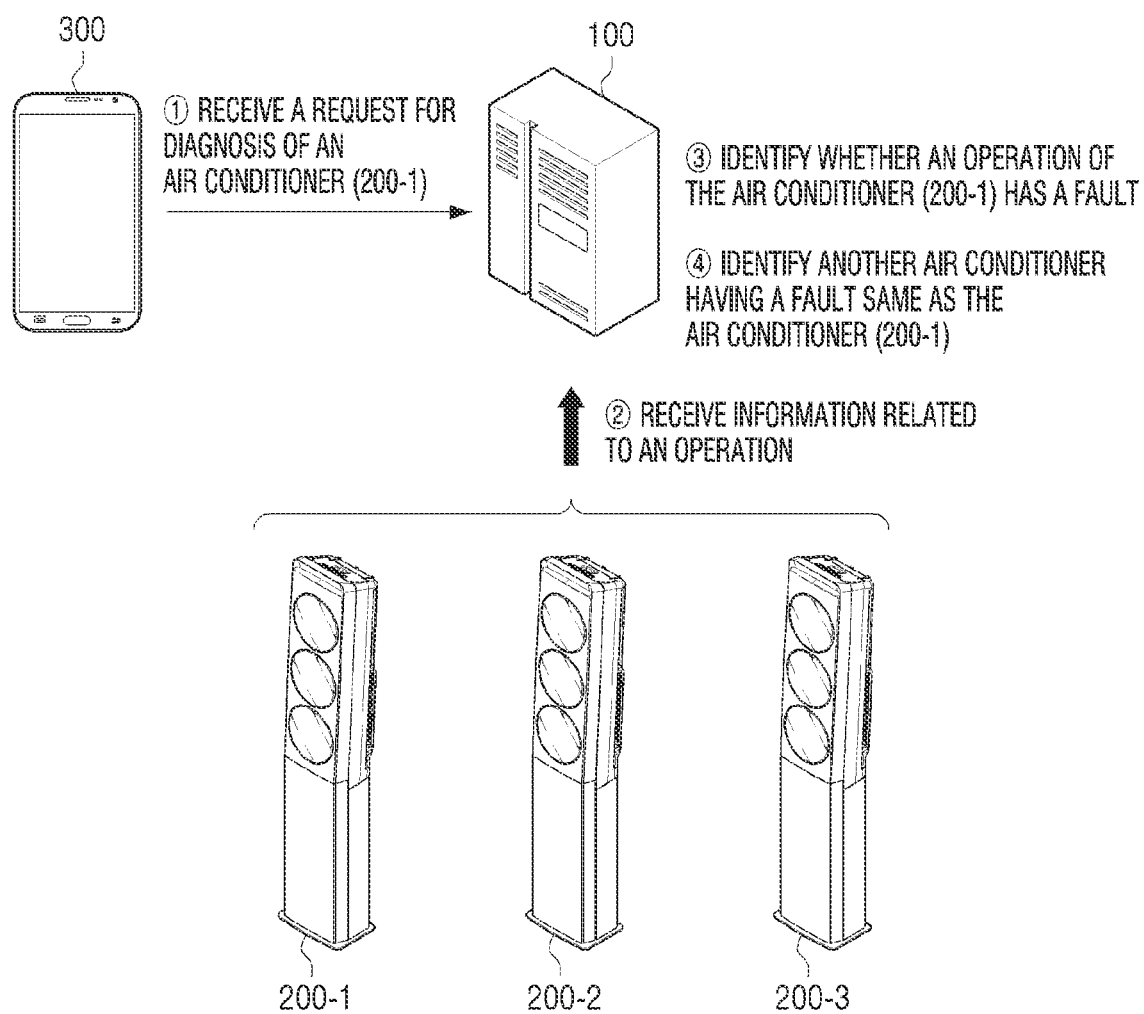
FIG. 8 is a diagram illustrating an example of identifying another external device performing an operation having a fault that is the same as the operation of the external device which receives a diagnosis request.

FIG. 8 is a diagram illustrating an example of identifying another external device performing an operation having a fault that is the same as the operation of the external device which receives a diagnosis request.

Referring to FIG. 8, when a diagnosis request for the air conditioner 200-1 is received from the communication device 300 through the communication unit 110 (①), the processor 120 can receive information related to the operation from the air conditioner 200-1 and other air conditioners 200-2, 200-3 of the same type as the air conditioner 200-1 (②). In this case, the same type may refer to the same type of home appliance, a same series product of a same manufacturer, or a same product.

The processor 120 can identify whether or not the operation of the air conditioner 200 has a fault based on information related to the operation received from the air conditioner 200-1 (③). The processor 120 may identify that the operation of the air conditioner that transmits, to the electronic device 100, information related to the operation which is identical with the information related to the operation of the air conditioner 200-1 by a preset value or more, among other air conditioners 200-2, 200-3, has the same fault as the operation of the air conditioner 200-1. That is, the processor 120 can identify an air conditioner for performing operations that have a fault which is the same as the operation of the air conditioner 200-1 among other air conditioners 200-2, 200-3 (④).

For the another air conditioner identified, the processor 120 may identify the cause of fault and may transmit the information on the fault to at least one of the identified other air conditioner or the communication device 300. In this case, a user of the communication device 300 and the other air conditioner identified can be registered in the electronic device 100 as being identical.

Referring to FIG. 8, the step of specifically identifying whether the operation of the air conditioner 200-1 which received the diagnosis request has a fault (③) is included, but unlike FIG. 8, without identifying whether there is actually a fault in the operation of the air conditioner 200-1, the processor 120 may identify other air conditioner having the same fault as the operation of the air conditioner 200-1 with a premise that the operation of the air conditioner 200-1 has a fault with only receiving the diagnosis request for the air conditioner 200-1 (①). That is, the air conditioner which transmits information related to the operation of the air conditioner 200-1, among the other air conditioners 200-2, 200-3, which is identical with the information related to the operation of the air conditioner 200-1 among the other air conditioners 200-2, 200-3 by a preset value or more as the air conditioner which performs the operation having the same fault as the operation of the air conditioner 200-1.

Figure 9:
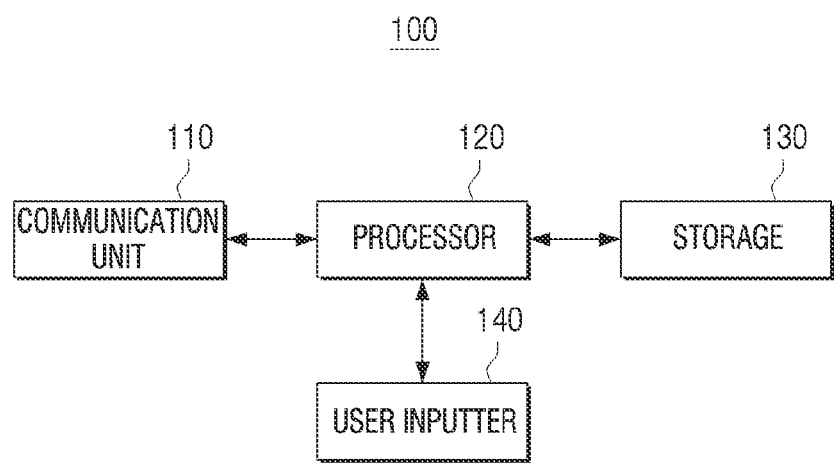
FIG. 9 is a block diagram illustrating a specific configuration of an electronic device according to various embodiments.

FIG. 9 is a block diagram illustrating a specific configuration of the electronic device 100 according to various embodiments.

Referring to FIG. 9, the electronic device 100 may further include at least one of a storage 130 and a user inputter 140 in addition to the communication unit 110 and the processor 120.

The storage 130 can store instructions or data associated with components of the electronic device 100 and an operating system (OS) for controlling the overall operation of components of the electronic device 100.

The storage 130 may be implemented with a non-volatile memory (e.g., hard disk, solid state drive (SSD), flash memory), a volatile memory, or the like.

In the storage 130, user information for at least one of a plurality of external devices 200-1, 200-2, . . . , 200-n may be stored or registered. The user information for the communication device 300 can be stored and registered in the storage 130.

The processor 120, when a plurality of air conditioners are included in the plurality of external devices 200-1, 200-2, . . . , 200-n, if a diagnosis request for "air conditioner" which is not specified is received from the communication device 300, the processor 120 may perform diagnosis for an air conditioner corresponding to the user information of the communication device 300 among the plurality of air conditions based on user information stored in the storage 130.

The storage 130 may store metadata about at least one operation among the plurality of external devices 200-1, 200-2, . . . , 200-n. The metadata may include information on a fault of operation of at least one external device, a cause of the fault, and information on a fault.

Specifically, the metadata may include information about the state of a specific external device corresponding to the fault of the operation of the specific external device. The metadata may include information about the state of one or more external devices corresponding to the cause of the identified fault. The metadata may also include information about the state of at least one component in the specific external device corresponding to the fault of the specific external device.

For example, if a specific external device is an air conditioner, a state where the ambient temperature is maintained at a temperature above a predetermined temperature, even though a cooling operation of the air conditioner where the desired temperature is set is performed above a predetermined time may indicate that the operation of the air conditioner has a fault and may be registered in the metadata. In addition, metadata can include information about various states corresponding to fault of operation of at least one external device, the cause of the fault, information on various states corresponding to the fault.

The processor 120 may perform diagnosis on each of the plurality of external devices 200-1, 200-2, . . . , 200-n using information related to any one operation among the plurality of external devices 200-1, 200-2, . . . , 200-n, based on the metadata stored in the storage 130.

The user inputter 140 receives various commands and/or information from a user. The processor 120 may perform functions corresponding to user commands inputted through the user inputter 140, and store information inputted through the user inputter 140 in the storage 130.

The user inputter 140 may be implemented with a separate keypad including one or more buttons and receive a command or information from a user.

The user inputter 140 may include a microphone (not shown) to receive commands or information in a voice form, or may be implemented as a touch screen in conjunction with a display (not shown) for receiving commands or information in a touch mode or may be implemented as a separate touchpad (not shown).

The user inputter 140 may receive a signal including instructions or information from a separate device (not shown) for controlling the electronic device 100.

The processor 120 may register user information for at least one of a plurality of external devices 200-1, 200-2, . . . , 200-*n* and the communication device 300 to the storage 130 based on information inputted through the user inputter 140.

The processor 120 may store and construct metadata for diagnosing at least one of a plurality of external devices 200-1, 200-2 . . . , 200-*n* in the storage 130 based on information inputted through the user inputter 140.

Although not shown in FIG. 9, if the electronic device 100 is implemented in a system form including at least one communication device (not shown) and a main computer (not shown), the main computer (not shown) can include a display (not shown) and the user inputter 140.

The main computer (not shown) may display information related to an operation of a plurality of external devices 200-1, 200-2, . . . , 200-*n* through the display (not shown) and display user information of at least one of the plurality of external devices 200-1, 200-2, . . . , 200-*n* and the communication device 300.

A method of diagnosing a fault of an electronic device according to an embodiment will be described below.

Figure 10:
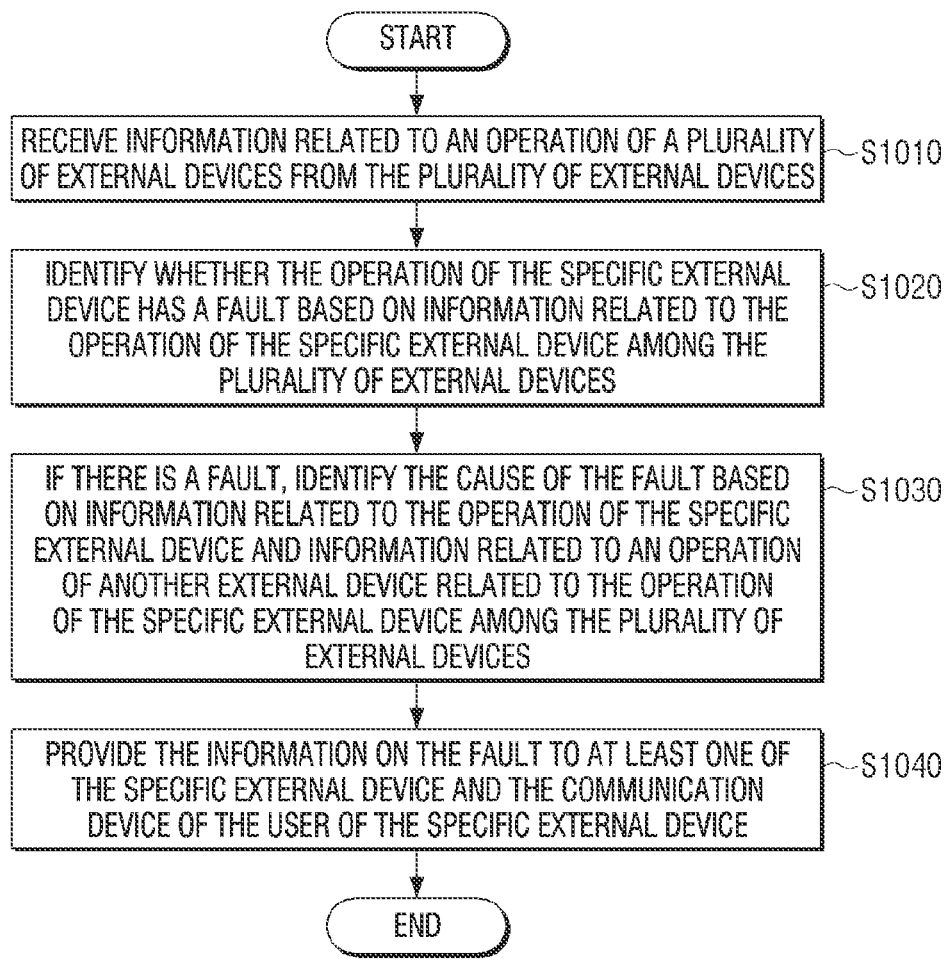
FIG. 10 is a flowchart illustrating an example of a method for diagnosing a fault of an electronic device according to an embodiment.

FIG. 10 is a flowchart illustrating an example of a method for diagnosing a fault of an electronic device according to an embodiment.

Referring to FIG. 10, the method of diagnosing the fault may receive information related to the operation of the plurality of external devices from the plurality of external devices in operation S1010.

Specifically, information related to the operation of each of the plurality of external devices can be received from each of the plurality of external devices. The information related to the operation of the external device can include information on the process and the result of performing the operation by the external device as well as information on the state of at least one of the components in the external device used to perform the operation by the electronic device.

Whether the operation of the specific external device has a fault may be identified based on information related to the operation of the specific external device among the plurality of external devices in operation S1020. Specifically, it may be identified whether the operation of a specific external device has a fault, and if there is a fault, what fault it is. In this case, metadata for a plurality of external devices prestored in the electronic device can be used.

According to the determined cycle based on at least one of the number of times the diagnosis request is received for the specific external device and the history of the operation of the specific external device, whether the operation of the specific external device has a fault may be identified.

If there is a fault based on the identification result, the cause of the fault can be identified based on information related to the operation of the external device having a fault and information related to the operation of another external device which is associated with the operation of the external device among the plurality of external devices in operation S1030. In this case, metadata for a plurality of external devices prestored in the electronic device 100 can be used.

The other external device that is associated with the operation of the specific external device may refer to another external device which has the same user as the specific external device and/or the other external device in the vicinity of the specific external device (within a predetermined distance from a specific external device). In this case, the predetermined distance can vary depending on what type of home appliance the external device is.

The information on the fault may be provided to at least one of the external device and the communication device of the user of the external device in operation S1040.

In the method of diagnosing the fault, identifying whether there is a fault in the operation of a specific external device may be based on the request for diagnosis of the external device.

Figure 11:
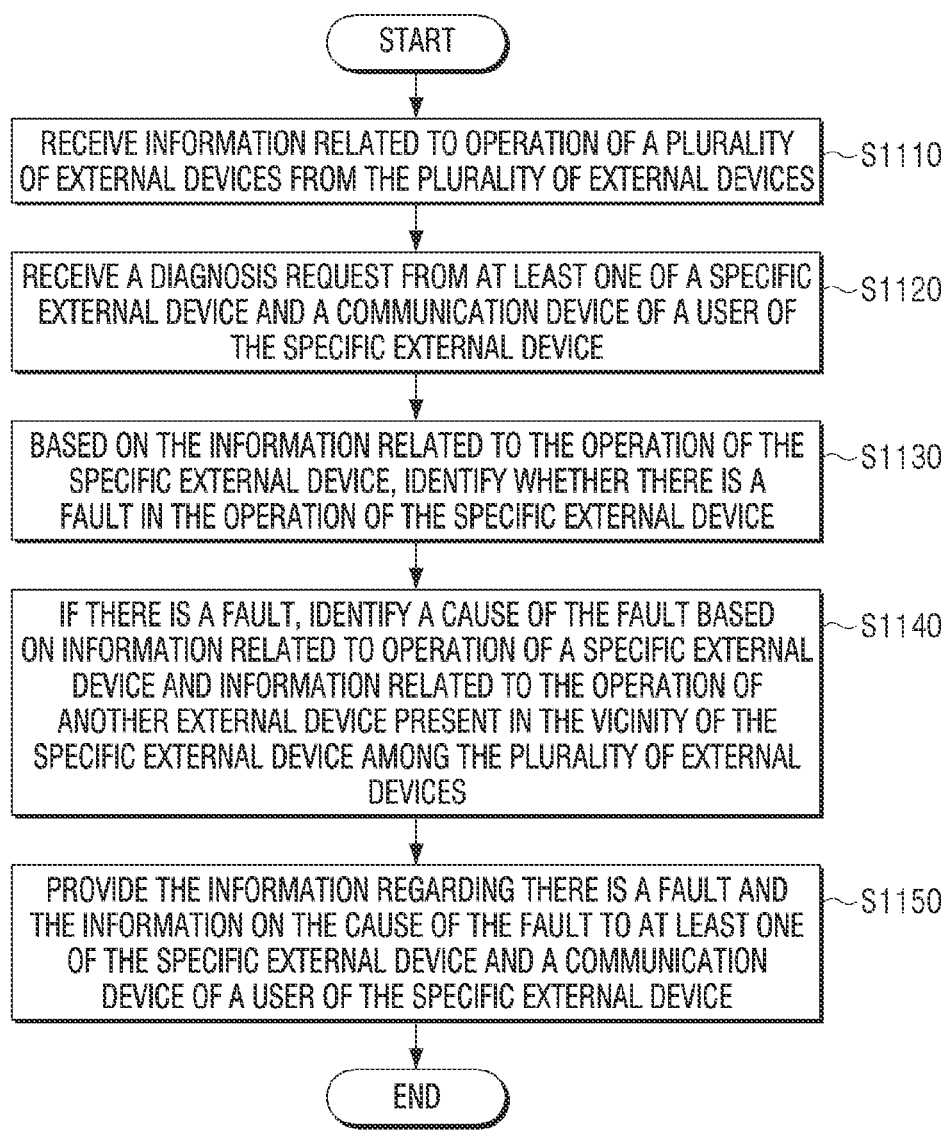
FIG. 11 is a flowchart illustrating an example which further specifies the flowchart of FIG. 10.

FIG. 11 is a flowchart illustrating an example of identifying a fault in an operation of a specific external device based on the diagnosis request.

Referring to FIG. 11, the method of diagnosing the fault may receive information related to operation of a plurality of external devices from the plurality of external devices in operation S1110, and may receive a diagnosis request from at least one of a specific external device, which is one of a plurality of external devices, and a communication device of a user of the specific external device in operation S1120. At this time, the diagnosis request may be for a specific external device.

Whether there is a fault in the operation of the specific external device may be identified based on the information related to the operation of the specific external device which is subject to the diagnosis request in operation S1130.

As a result of the identification, if there is a fault, the cause of the fault can be identified based on information related to operation of a specific external device and information related to the operation of another external device present in the vicinity of the specific external device among the plurality of external devices in operation S1140. Referring to FIG. 11, information related to the operation of the other external device present in the vicinity of the specific external device is used, but unlike FIG. 11, any external device which is related to the operation of the specific external device, even if not existing in the vicinity of the specific external device, can use the information related to the operation.

The information regarding there is a fault and the information on the cause of the fault can be provided to at least one of the specific external device and a communication device of a user of the specific external device in operation S1150. This corresponds to an example of providing information about the identified fault.

Unlike FIG. 11, as to the method of diagnosing the fault, in a state where there is a fault in the operation of each external device is identified by receiving information related to the operation from the plurality of external devices, if a diagnosis request is received, information on the fault may be provided.

Specifically, in a state where the operation of a particular external device among the plurality of external devices is identified as having a fault and the cause of the fault is identified, a diagnosis request for the external device may be received from the external device and the communication device of the user of the external device, and based on the received diagnosis request, the information on the identified cause of the fault may be transmitted to at least one of the external device or the communication device.

The method of diagnosing the fault may identify the cause of the fault by using environment information received from other external devices existing in the vicinity of a specific external device identified as having a fault in operation.

Figure 12:
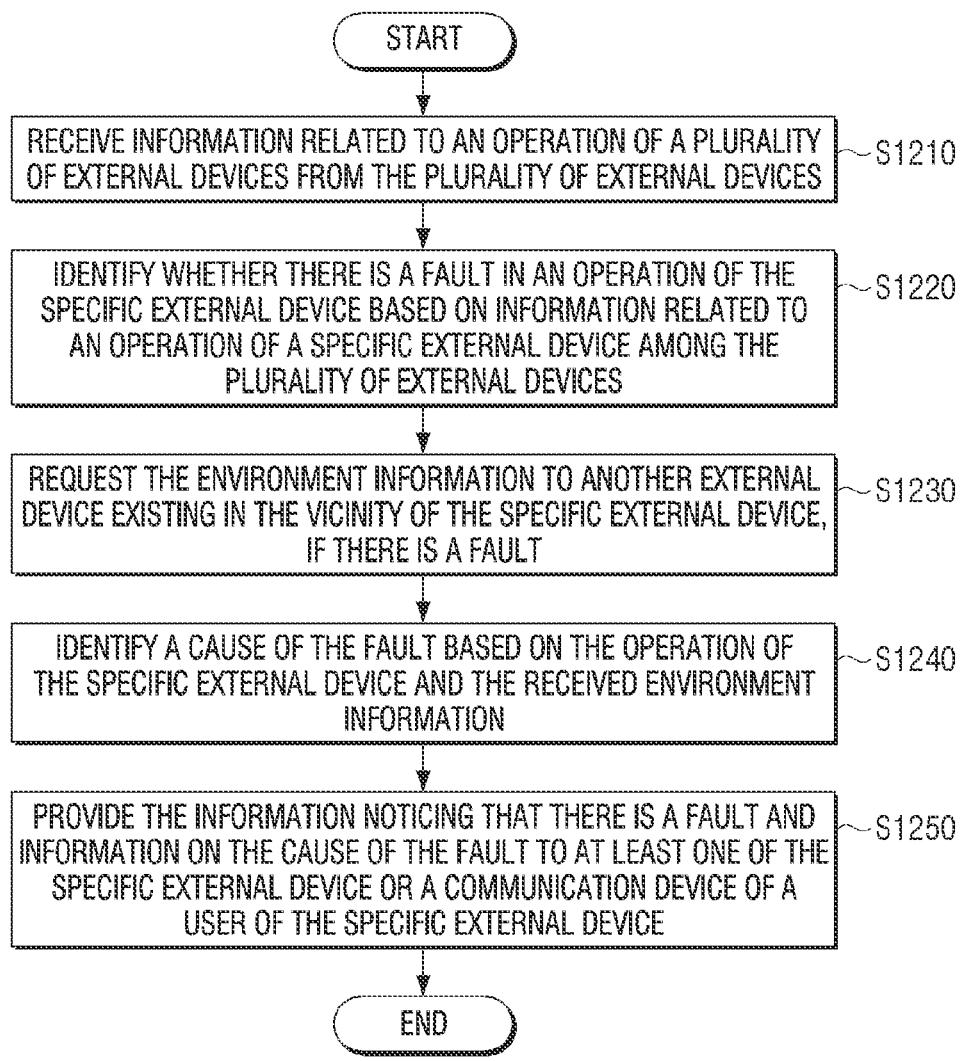
FIG. 12 is a flowchart illustrating an example of receiving environment information of an external device having a fault in operation from another external device and identifying a cause of a fault based thereon.

FIG. 12 is a flowchart illustrating an example of receiving environment information of an external device having a fault in operation from another external device and identifying a cause of a fault based thereon.

Referring to FIG. 12, information related to operation of a plurality of external devices is received from a plurality of external devices in operation S1210, whether there is a fault in an operation of the specific external device based on information related to operation of a specific external device among the plurality of external devices is identified in operation S1220, if there is a fault, the environment information can be requested to other external devices existing in the vicinity of the specific external device in operation S1230.

The environment information can include information on the temperature, humidity, air pollution level, communication environment, etc. of a place where the external device subject to the diagnosis is present. The environment information may include information on time for diagnosing a specific external device.

When environment information is received from another external device as a result of the request, the cause of the fault may be identified based on the operation of the specific external device and the received environment information in operation S1240.

The information noticing that there is a fault and/or information on a cause of the fault can be provided to at least one of the specific external device or a communication device of a user of the specific external device in operation S1250.

The method of diagnosing the fault may, when a cause of the fault is identified, identify whether there is a fault in the external device having a fault in operation based on the identified cause of the fault. In this case, metadata regarding the plurality of external devices prestored in the electronic device can be used.

The information on the identified fault may be provided to at least one of the external device having a fault in operation and the communication device of a user of the external device.

Figure 13:
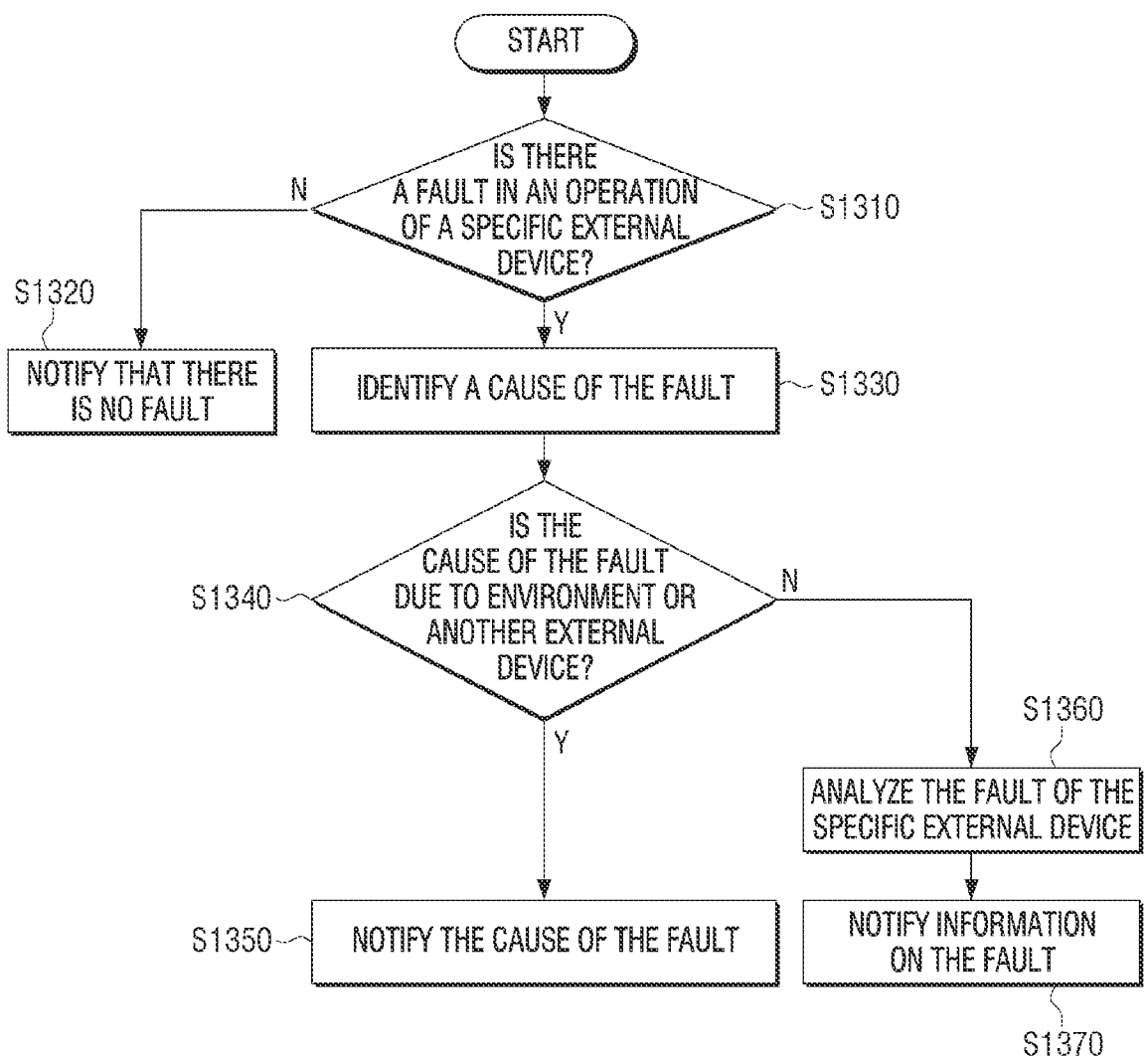
FIG. 13 is an algorithm to describe an example of determining whether there is a fault in a specific external device based on identifying a cause of a fault in an operation of a specific external device.

FIG. 13 is an algorithm to describe an example of determining whether there is a fault in a specific external device based on identifying a cause of a fault in an operation of a specific external device.

Referring to FIG. 13, whether there is a fault in operation of a specific external device among the plurality of external devices is identified based on information related to the operation of the plurality of external devices received from the plurality of external devices in operation S1310, and if there is no fault as a result of identification in operation S1310-N, that there is no fault can be noticed in operation S1320. Specifically, information indicating no fault may be transmitted to the external device or the communication device of the user of the external device.

If there is a fault as a result of identification in operation S1310-Y, the cause of the fault can be identified in operation S1330. Specifically, the cause of the default can be identified based on information related to the operation of a corresponding external device received from an external device having a fault in operation, information related to the operation of another external device received from another external device and environment information.

As a result of identification, if the cause of the fault is due to another external device and/or ambient environment, rather than an external device having a fault in operation in operation S1340-Y, a cause of the fault can be notified to a user in operation S1350. To be specific, the information about the cause can be transmitted to the external device having a fault in operation or the communication device of the user of the external device.

If the cause of the fault is not due to another external device and/or the ambient environment in operation S1340-N, whether there is a fault in the external device itself, what is the fault, what is the cause of the fault, or the like, can be intensively analyzed based on information related to the operation of the external device having a fault in operation in operation S1360. At this time, metadata previously stored in connection with the operation of the external device can be used.

The information about the fault can be noticed to the user in operation S1370. The information about the fault can be transmitted to the external device having a fault in operation or the communication device of the user of the external device. The information about the fault can include a content of the fault, a cause of the fault, information on the AS service, or the like.

The method of diagnosing the fault may include, based on receiving a diagnosis request, may perform preemptive diagnosis by identifying another external device performing an operation with a fault which is the same as the operation of the external device for which diagnosis is requested, among the plurality of external devices based on the information related to the operation of the plurality of external devices.

Figure 14:
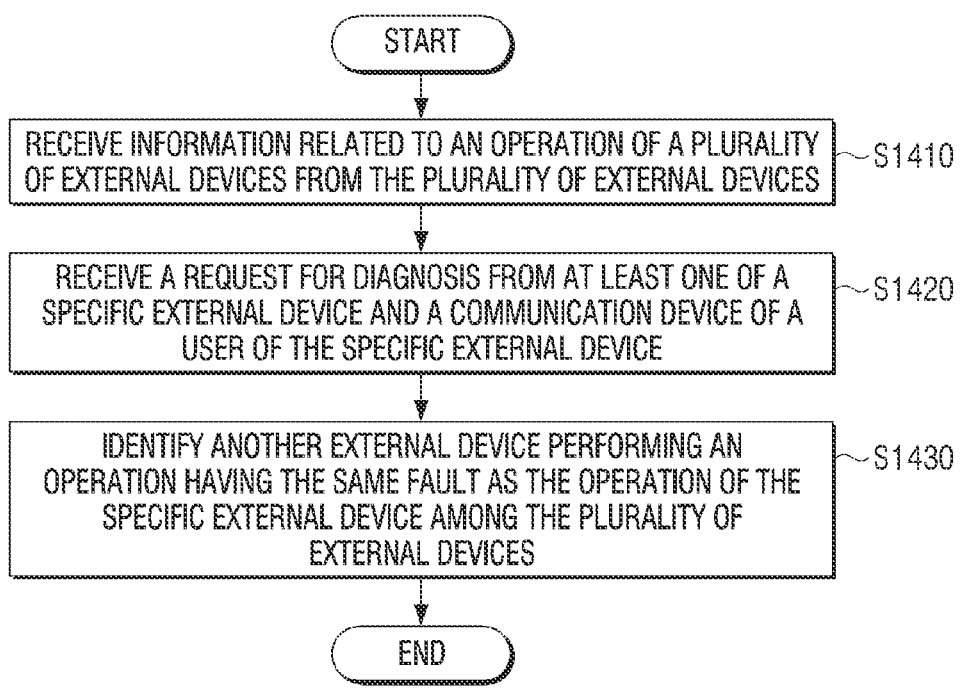
FIG. 14 is a flowchart illustrating an example of identifying another external device performing an operation having the same fault as the operation of the external device which receives a diagnosis request.

FIG. 14 is a flowchart illustrating an example of identifying another external device performing an operation having the same fault as the operation of the external device which receives a diagnosis request.

Referring to FIG. 14, when information related to an operation is received from a plurality of external devices in operation S1410, and a request for diagnosis is received from at least one of a specific external device among a plurality of external devices and a communication device of a user of the specific external device in operation S1420, another external device performing operations having a same fault as the operation of a specific external device among the plurality of external devices can be identified based on information related to the operation of the plurality of external devices in operation S1430.

Although not illustrated in FIG. 14, a cause of a fault of an operation of another external device identified as performing an operation having a fault which is the same as the operation of the specific external device can be identified. In this case, the cause of the fault can be identified based on information related to the operation of the plurality of external devices.

The identified information of the cause of the fault of the external device may be provided to at least one of the identified other external device and the communication device of the user of the other external device.

Referring to FIGS. 10 to 14, the method of diagnosing the fault can be performed through the processor 120 and the communication unit 110 of the electronic device 100 described through FIG. 2 and/or FIG. 9.

If the electronic device 100 includes one or more communication device (not shown) and a main computer (not shown), the method of diagnosing the fault can be performed based on the operation of the communication device (not shown) and the main computer (not shown).

The method of diagnosing the fault can be implemented through a system including at least one of the electronic device 100 and another electronic device (not shown).

The various example embodiments described above may be implemented in a recordable medium which is readable by computer or a device similar to computer using software, hardware, or the combination of software and hardware.

By hardware implementation, the embodiments of the disclosure may be implemented using, for example, and without limitation, at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electric units for performing other functions, or the like.

In some cases, embodiments described herein may be implemented by the processor 120 itself. According to a software implementation, embodiments such as the procedures and functions described herein may be implemented with separate software modules. Each of the above-described software modules may perform one or more of the functions and operations described herein.

The computer instructions for performing the processing operations of the electronic device 100 according to the various embodiments described above may be stored in a non-transitory computer-readable medium. The computer instructions stored in this non-transitory computer-readable medium may cause the above-described specific device to perform the processing operations in the electronic device 100 according to the above-described various example embodiments when executed by the processor of the device.

The non-transitory computer readable medium may refer to a medium that stores data semi-permanently and be readable by an apparatus Rather than a medium that stores short-term data such as registers, caches, and memory. Specifically, the aforementioned various applications or programs may be stored and provided in the non-transitory computer readable medium, for example, a compact disc (CD), a digital versatile disc (DVD), a hard disc, a Blu-ray disc, a universal serial bus (USB), a memory card, a read only memory (ROM), and the like.

Also, although the preferred embodiment of the present invention has been illustrated and described above, the present invention is not limited to the specific embodiment described above. And, the present invention can be implemented in various modifications by those of ordinary skill in the art without departing from the gist of the present invention claimed in the claims, as well as these modifications are technical of the present invention. It should not be understood individually from ideas or prospects.

What is claimed is:

1. An electronic device for diagnosing a fault of a plurality of external devices, comprising:
   a communication unit; and
   a processor,
   wherein the processor is further configured to:
      receive, from the plurality of external devices, information related to an operation of the plurality of external devices through the communication unit,
      receive a diagnosis request for a first external device from at least one of the first external device or a communication device of a user of the first external device through the communication unit,
      based on the information related to the operation of any one of the plurality of external devices and a cycle that is determined based on at least one of a number of receiving the diagnosis request with respect to the first external device and a history of the fault, identify whether the operation of the first external device for which the diagnosis is requested has a fault based on receiving the diagnosis request,
      in response to receiving the diagnosis request, identify a second external device which performs an operation having a same fault as an operation of the first external device for which the diagnosis is requested, among the plurality of external devices, based on the information related to the operation of the plurality of external devices,
      request environment information of a place where the first external device is present to another external device present in a vicinity of the first external device among the plurality of external devices through the communication unit,
      receive the environment information from the another external device through the communication unit,
      based on the operation of the first external device having a fault, identify a cause of the fault based on the information related to the operation of the first external device, information related to an operation of another external device of the plurality of external devices that is relevant to the operation of the external device and the received environment information,
      identify a cause of the fault of the identified second external device based on the information related to the operation of the plurality of external devices,
      provide, through the communication unit, information on the identified fault to the at least one of the first external device and the communication device of a user of the first external device, and
      provide, through the communication unit, information on the identified fault to at least one of the identified second external device and a communication device of a user of the identified second external device,
   wherein the environment information includes information of at least one of the temperature, humidity, air pollution level, or communication environment of a location of the first external device.

2. The electronic device of claim 1, wherein the processor is further configured to:
   identify whether the first external device has a fault based on the identified cause of the fault, and
   provide the information on the identified fault to at least one of the first external device and the communication device of a user of the first external device.

3. The electronic device of claim 1, wherein the processor is further configured to, based on the fault of the operation of the first external device, transmit information indicating the fault and information on the identified cause of the fault to at least one of the first external device and the communication device of a user of the first external device.

4. The electronic device of claim 1, wherein the processor is further configured to identify the cause of the fault based on information relevant to the operation of the first external device and information relevant to an operation of the another external device which is present in a vicinity of the first external device among the plurality of external devices.

5. A method of diagnosing a fault of an electronic device for a plurality of external devices, the method comprising:
   receiving, from the plurality of external devices, information related to an operation of the plurality of external devices;
   receiving a diagnosis request for a first external device from at least one of the first external device or a communication device of a user of the first external device;
   based on the information related to the operation of any one of the plurality of external devices and a cycle that is determined based on at least one of a number of receiving the diagnosis request with respect to the first external device and a history of the fault, identifying whether the operation of the first external device for which the diagnosis is requested has a fault based on receiving the diagnosis request;

in response to receiving the diagnosis request, identify in a second external device which performs an operation having a same fault as an operation of the first external device for which the diagnosis is requested, among the plurality of external devices, based on the information related to the operation of the plurality of external devices;

requesting environment information of a place where the first external device is present to another external device present in a vicinity of the first external device among the plurality of external devices;

receiving the environment information from the another external device;

based on the operation of the first external device having a fault, identifying a cause of the fault based on the information related to the operation of the first external device, information related to an operation of another external device of the plurality of external devices that is relevant to the operation of the external device and the received environment information;

identifying a cause of the fault of the identified second external device based on the information related to the operation of the plurality of external devices;

providing information on the identified fault to the at least one of the first external device and the communication device of a user of the first external device, and providing information on the identified fault to at least one of the identified second external device and a communication device of a user of the identified second external device, wherein the environment information includes information of at least one of temperature, humidity, air pollution level, or communication environment of a location of the first external device.

6. The method of claim 5, further comprising:

identifying whether the first external device has a fault based on the identified cause of the fault; and providing the information on the identified fault to at least one of the first external device and the communication device of a user of the first external device.

7. The method of claim 5, wherein the providing comprises, based on the fault of the operation of the first external device, transmitting information indicating the fault and information on the identified cause of the fault to at least one of the first external device and the communication device of a user of the first external device.

* * * * *